(No Model.)

J. C. BAUER.
RACKING FAUCET.

No. 249,736.

Patented Nov. 22, 1881.

Attest:
A. Barthel
E. Scully

Inventor:
John C. Bauer
by Thos. S. Sprague
Atty.

UNITED STATES PATENT OFFICE.

JOHN C. BAUER, OF DETROIT, MICHIGAN, ASSIGNOR OF ONE-HALF TO F. LOUIS DOHMSTREICH, OF SAME PLACE.

RACKING-FAUCET.

SPECIFICATION forming part of Letters Patent No. 249,736, dated November 22, 1881.

Application filed May 4, 1881. (No model.)

*To all whom it may concern:*

Be it known that I, JOHN C. BAUER, of Detroit, Wayne county, Michigan, have invented an Improvement in Racking-Faucets, of which the following is a specification.

The nature of this invention relates to certain new and useful improvements in the construction of faucets particularly designed for brewers' use in racking-off beer.

As ordinarily constructed, these faucets are operated by a key which is inserted to turn the valve, which key must be removed before the faucet can be introduced, while in some cases the faucet is so constructed as to perform the office of the key. In these cases, however, the expense of manufacture is considerable. They are not positive at all times in their operation, and hence must necessarily cause a waste of the contents of the cask in their use.

The object of this invention is to obviate all these difficulties; and to that end the invention consists in the peculiar construction of a spigot arranged within a shell, all as more fully hereinafter set forth.

Figure 1:
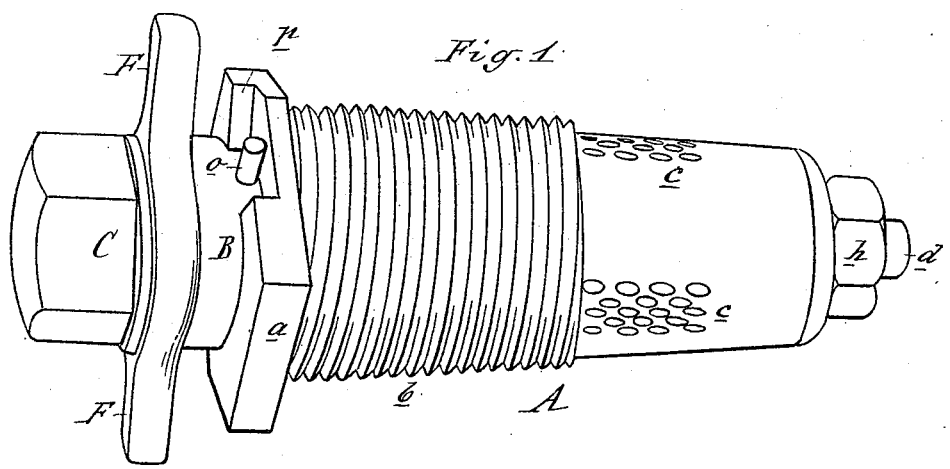
Figure 2:
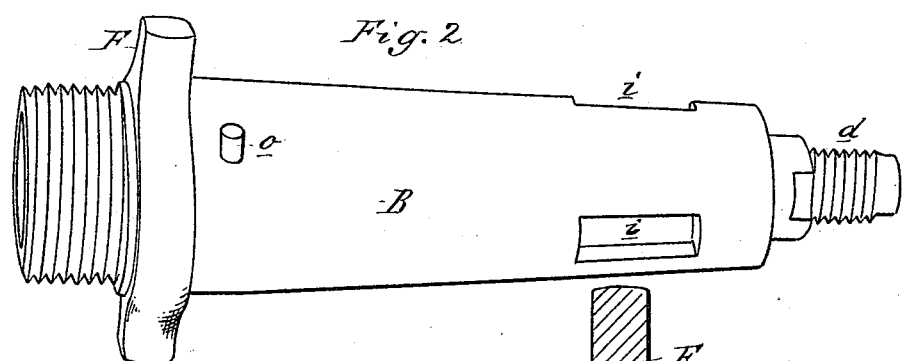
Figure 3:
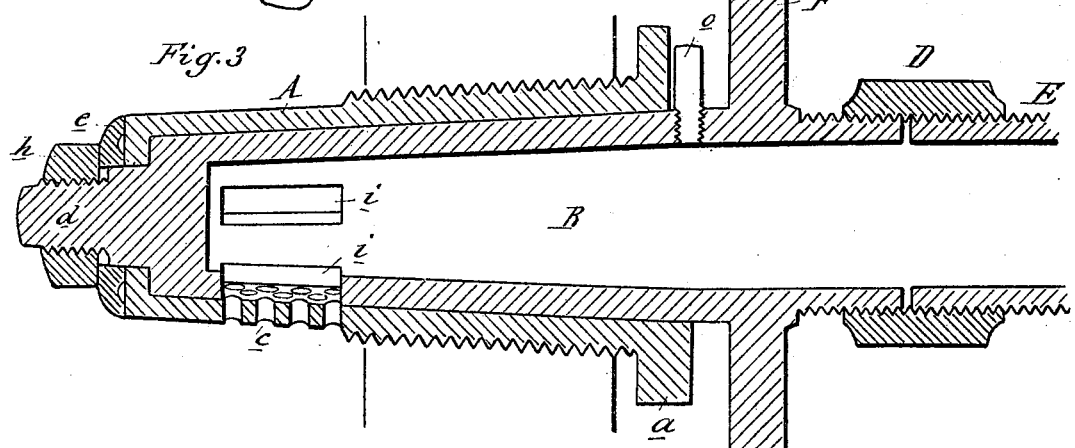

Figure 1 is a perspective view of my improved racking-faucet. Fig. 2 is a similar view of the spigot. Fig. 3 is a longitudinal section with faucet open, and showing hose connected for "racking-off."

In the accompanying drawings, which form a part of this specification, A represents the shell, provided with the flange $a$ and thread $b$, and is designed to be screwed into the head of the cask. The inner end of this shell is diminished and provided with the perforations $c$, which give communication to the interior of the shell, the bore of which is tapering and smooth.

B represents the spigot, which is designed to fit snugly within the bore of the shell. The inner end of this spigot is closed and provided with a threaded stem, $d$, to receive the washer $e$ and nut $h$, which, when put together, closes the inner end of the shell. Near the inner end of the spigot are formed the rectangular openings $i$, affording a passage to the interior of the spigot when the latter is turned so as to be coincident with the perforations $c$ in the shell. The outer end of the spigot is threaded to receive the cap C when not in use, or the coupling D for attaching a hose, E, when it is desired to draw off the contents of the cask to which the faucet may be applied. Wings F are also provided upon the spigot, by means of which it may be turned to close or disclose the discharge-openings, while a pin, $o$, engaging with stops $p$ in the flange $a$, limits the movement of the spigot.

What I claim as my invention is—

1. A faucet consisting of a tapering shell, A, externally threaded to screw into a barrel-head, and provided with groups of perforations near its inner end, in combination with a spigot or valve, B, closely fitting the interior of said shell throughout its length, and provided at its inner end with rectangular openings to correspond and register with the groups of perforations in the outer shell, and having at its outer end wings F, by which it can be turned, substantially as and for the purpose specified.

2. In combination with the externally screw-threaded and perforated shell A, provided with a recess, $p$, the slotted spigot B, having wings F, as described, and provided with a pin, $o$, to move in the recess $p$ of the outer shell to limit its movement, substantially as described.

JOHN C. BAUER.

Witnesses:
H. S. SPRAGUE,
E. SCULLY.